US012565900B1

(12) United States Patent
Huang et al.

(10) Patent No.: US 12,565,900 B1
(45) Date of Patent: Mar. 3, 2026

(54) FAN BEARING FIXING AND ANTI-SLIPPING STRUCTURE

(71) Applicant: ASIA VITAL COMPONENTS CO., LTD., New Taipei City (TW)

(72) Inventors: Jing-Ping Huang, New Taipei City (TW); Feng Liu, New Taipei City (TW); Zuo Zou, New Taipei City (TW); Sung-Wei Sun, New Taipei City (TW)

(73) Assignee: ASIA VITAL COMPONENTS CO., LTD., New Taipei City (TW)

( * ) Notice: Subject to any disclaimer, the term of this patent is extended or adjusted under 35 U.S.C. 154(b) by 0 days.

(21) Appl. No.: 19/171,537

(22) Filed: Apr. 7, 2025

(30) Foreign Application Priority Data

Feb. 14, 2025 (TW) ................................. 114105606

(51) Int. Cl.
*F04D 29/059* (2006.01)
*F16C 25/08* (2006.01)
*F16C 27/04* (2006.01)

(52) U.S. Cl.
CPC .......... *F04D 29/059* (2013.01); *F16C 25/083* (2013.01); *F16C 27/04* (2013.01); *F16C 2360/46* (2013.01)

(58) Field of Classification Search
CPC .. F04D 25/062; F04D 29/0563; F04D 29/059; F04D 19/002; F16C 2360/46; F16C 25/083
See application file for complete search history.

(56) References Cited

U.S. PATENT DOCUMENTS

| 4,164,690 | A | * | 8/1979 | Muller | H02K 29/08 |
| | | | | | 318/400.41 |
| 4,529,324 | A | * | 7/1985 | Champagne | F16C 25/083 |
| | | | | | 384/518 |
| 4,719,352 | A | * | 1/1988 | Miyatake | G01J 1/36 |
| | | | | | 250/350 |
| 6,565,316 | B2 | * | 5/2003 | Li | F04D 29/059 |
| | | | | | 417/423.12 |

(Continued)

FOREIGN PATENT DOCUMENTS

| EP | 3135929 | A1 | * | 3/2017 | ............ F16C 25/083 |
| TW | 452632 | B | | 9/2001 | |

(Continued)

OTHER PUBLICATIONS

Search Report issued by Taiwan Intellectual Property Office on Nov. 7, 2025, to Taiwan Invention Application No. 114105606.

*Primary Examiner* — Justin D Seabe
(74) *Attorney, Agent, or Firm* — Demian K. Jackson; Jackson IPG PLLC

(57) ABSTRACT
A fan bearing fixing and anti-slipping structure comprises a fan frame, a shaft core, two bearings, and a first spring. The fan frame includes a base with a bearing sleeve protruding therefrom on an air outlet side. The shaft core extends into the bearing sleeve. The two bearings are mounted within the bearing sleeve and on the shaft core, each bearing comprising an inner ring fitted with the shaft core and an outer ring fitted with the bearing sleeve. The first spring is sleeved on the shaft core and positioned between the inner rings of the two bearings, generating an axial elastic supporting force between the inner rings to secure them in a predetermined position.

3 Claims, 5 Drawing Sheets

(56)     References Cited

U.S. PATENT DOCUMENTS

| 2014/0154108 A1 * | 6/2014 | Hirosawa | F04D 25/062 |
| | | | 417/353 |
| 2017/0159707 A1 * | 6/2017 | Yamawaki | F04D 25/06 |
| 2024/0072602 A1 * | 2/2024 | Uchikawa | H02K 5/1735 |

FOREIGN PATENT DOCUMENTS

| TW | 202432956 A | 8/2024 |
| TW | M669727 U | 4/2025 |

* cited by examiner

FAN BEARING FIXING AND ANTI-SLIPPING STRUCTURE

This application claims the priority benefit of Taiwan patent application number 114105606 filed on Feb. 14, 2025, the disclosure of which is hereby incorporated by reference in its entirety.

FIELD OF THE INVENTION

The present invention relates to a bearing fixing structure, specifically a fan bearing fixing anti-slipping structure.

BACKGROUND OF THE INVENTION

As illustrated in FIG. 1, a conventional fan bearing structure comprises a fan blade 11, a base bracket 12, two bearings 13 and 14, and upper and lower springs 151 and 152. The fan blade 11 includes a rotating shaft core 111, and the base bracket 12 includes a bearing sleeve 121. The two bearings 13 and 14 are respectively installed within the bearing sleeve 121, and the rotating shaft core 111 is fitted into the bearings 13 and 14. A baffle 122 is disposed within the bearing sleeve 121, with the bearings 13 and 14 positioned above and below the baffle 122, respectively. The upper and lower springs 151 and 152 are respectively disposed between the baffle 122 and the bearings 13 and 14, applying pressure to the outer rings of the bearings 13 and 14. This ensures stability of the outer ring tracks and even force distribution during operation. The dual-spring design allows the balls within the bearings 13 and 14 to operate smoothly, reducing noise during low-speed fan operation.

Additionally, during installation and transportation, the springs 151 and 152 provide effective buffering, protecting the bearings 13 and 14 from damage due to external impacts.

However, this structure primarily enhances the stability of the outer rings of the bearings 13 and 14 and does not fully address radial sliding between the inner rings of the bearings and the rotating shaft core 111 during high-speed operation. Consequently, there remains a risk of premature bearing failure under high-speed conditions due to radial sliding.

Moreover, current fan bearing assemblies typically employ one of the following methods:

1. Clearance Fit Fixation: This method employs a clearance fit between the inner ring of the bearing and the rotating shaft core, as well as between the outer ring of the bearing and the bearing sleeve. It offers a straightforward process, high assembly efficiency, and low cost. However, the clearance fit between the inner ring and the rotating shaft core, and between the outer ring and the bearing sleeve, results in insufficient friction to resist radial sliding as fan speed increases. The centrifugal force generated by high-speed blade rotation exacerbates this issue, leading to bearing wear and failure over time, ultimately reducing the fan's lifespan.

2. Interference Fit and Glue Fixation: This method utilizes an interference fit between the inner ring of the bearing and the rotating shaft core, while the outer ring and bearing sleeve are secured with glue. However, this approach involves a complex assembly process, requiring precise dimensional control and accurate glue application, which decreases assembly efficiency and significantly raises manufacturing costs. Furthermore, external impacts can cause micro-cracks at the glue joints, leading to loss of internal pre-pressure within the bearing. As a result, the balls deviate from their predetermined raceways, causing micro-motion wear and eventual early bearing failure.

Thus, both methods exhibit clear shortcomings in terms of high-speed operational stability and cost management: (1) Clearance fit assemblies fail to effectively prevent radial sliding during high-speed operation; (2) Interference fit and glue fixation assemblies incur high costs and remain susceptible to failure under external forces. Consequently, existing technologies struggle to simultaneously achieve stability during high-speed fan operation, ease of assembly, and cost efficiency.

Addressing these conventional issues and shortcomings is a key focus for the inventor of the present application and related industry manufacturers striving for improvement.

SUMMARY OF THE INVENTION

An object of the present invention is to provide a fan bearing fixing and anti-slipping structure that can solve the above-mentioned problem.

The fan bearing fixing and anti-slipping structure of the present invention includes: a fan frame, a shaft core, a first bearing, a second bearing and a first spring. The fan frame has a base, and a protruding bearing sleeve is arranged on the base. The shaft core has a connection end connected to a fan wheel, and a free end extending into the bearing sleeve. The first bearing and the second bearing are located in the bearing sleeve and are arranged on the shaft core to support the fan wheel to rotate. The first bearing and the second bearing respectively include an inner ring, an outer ring and a rolling element disposed between the inner ring and the outer ring. The outer ring is fitted with the bearing sleeve, and the inner ring is fitted with the shaft core.

The first spring is sleeved on the shaft core and is located between the inner rings of the first bearing and the second bearing. The two ends of the first spring respectively abut against the inner rings of the first bearing and the second bearing to generate an axial elastic supporting force between the inner rings of the first and second bearings, thereby firmly fixing the first and second bearings in a predetermined position, thereby restricting the radial relative sliding between the inner rings of the first and second bearings and the shaft core during high-speed operation of the fan. In this way, the stability of the first and second bearings can be effectively improved and the service life thereof can be extended.

BRIEF DESCRIPTION OF THE DRAWINGS

The structure and technical means employed by the present invention to achieve the above and other objectives are best understood by referring to the following detailed description of the preferred embodiment and the accompanying drawings, wherein.

DETAILED DESCRIPTION OF THE PREFERRED EMBODIMENTS

The above-mentioned objectives and structural and functional features of the present invention will be described based on the preferred embodiments of the accompanying drawings.

Figure 1:
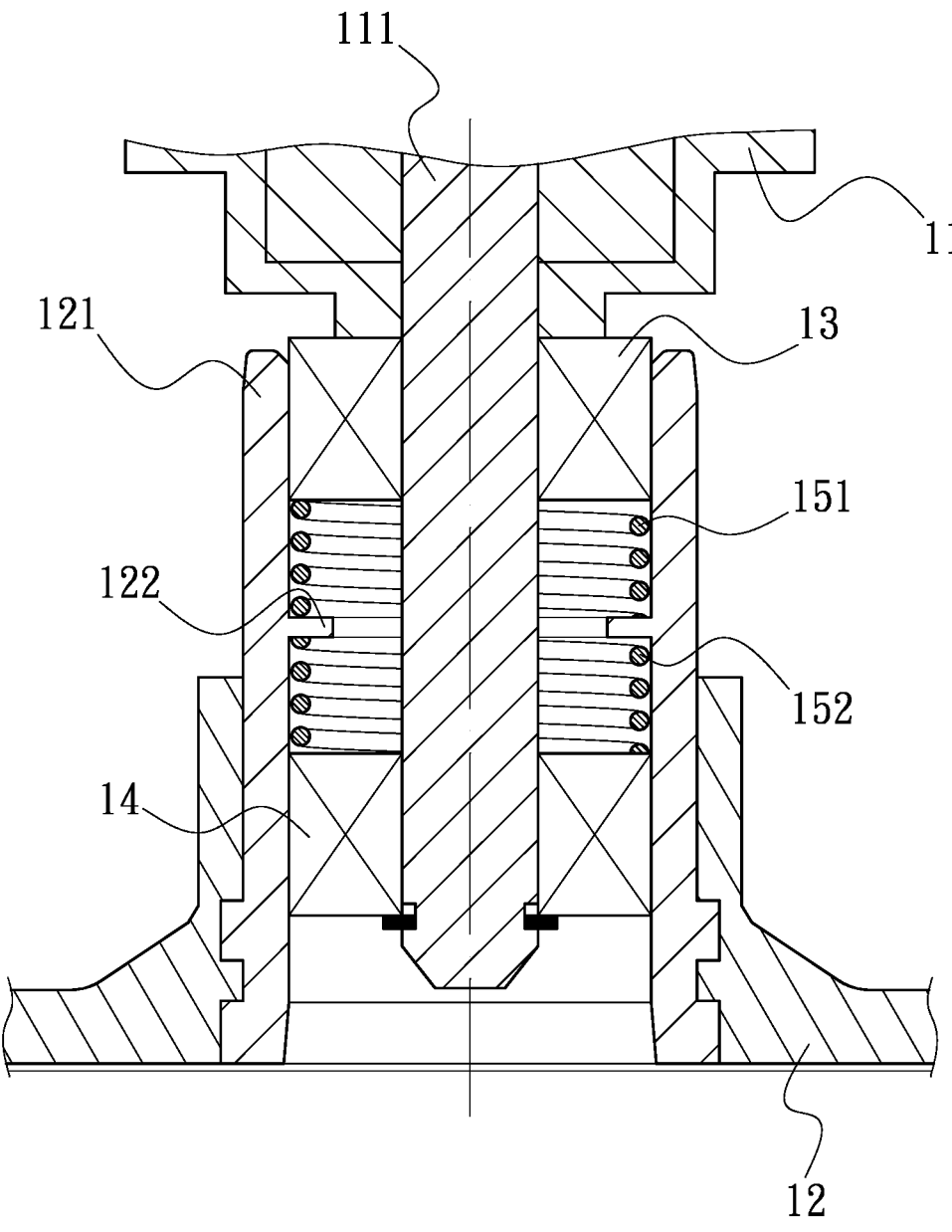
FIG. 1 is a schematic diagram of the prior art.
Figure 2:
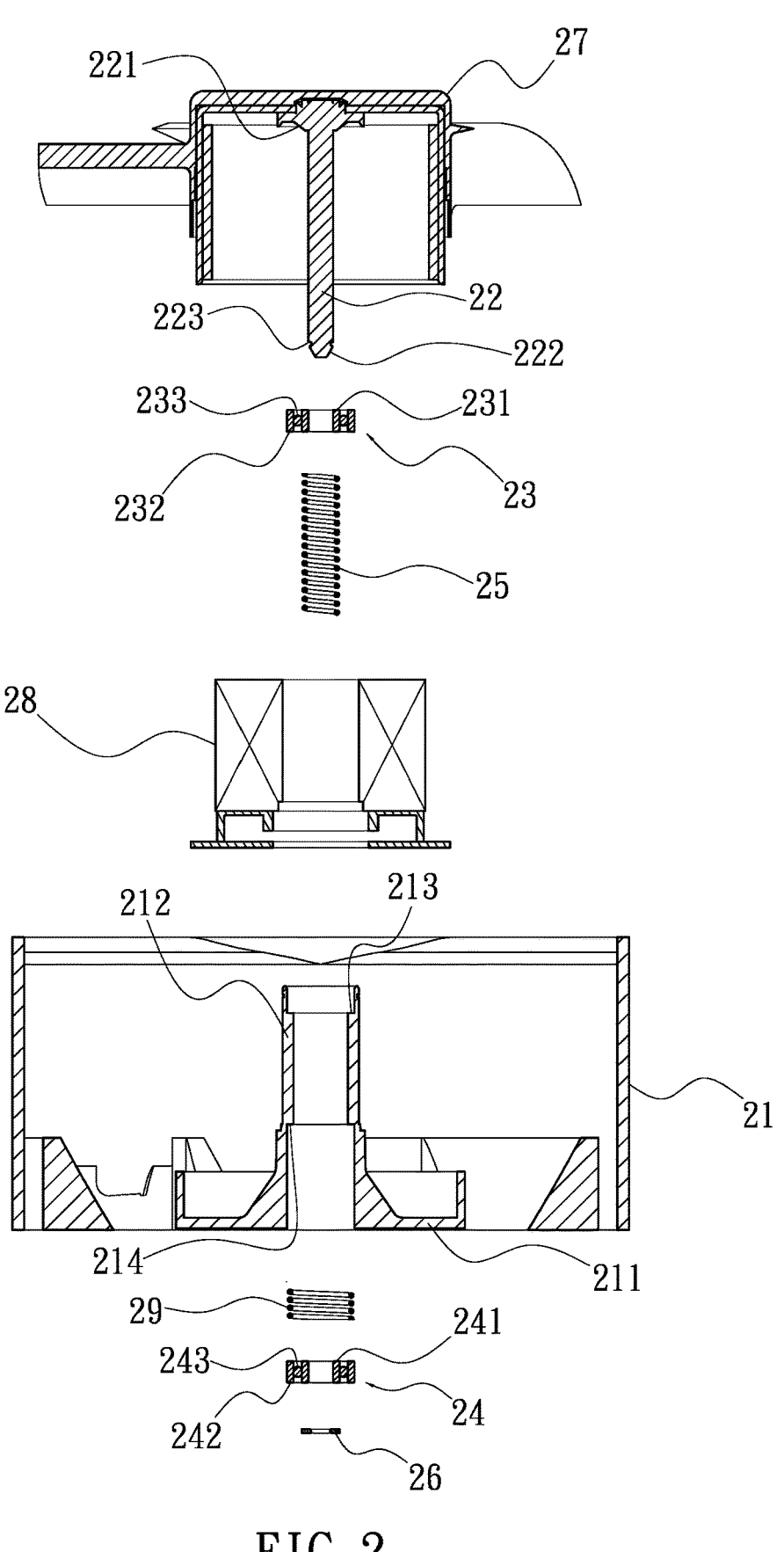
FIG. 2 is a schematic cross-sectional exploded view of the present invention.
Figure 3:
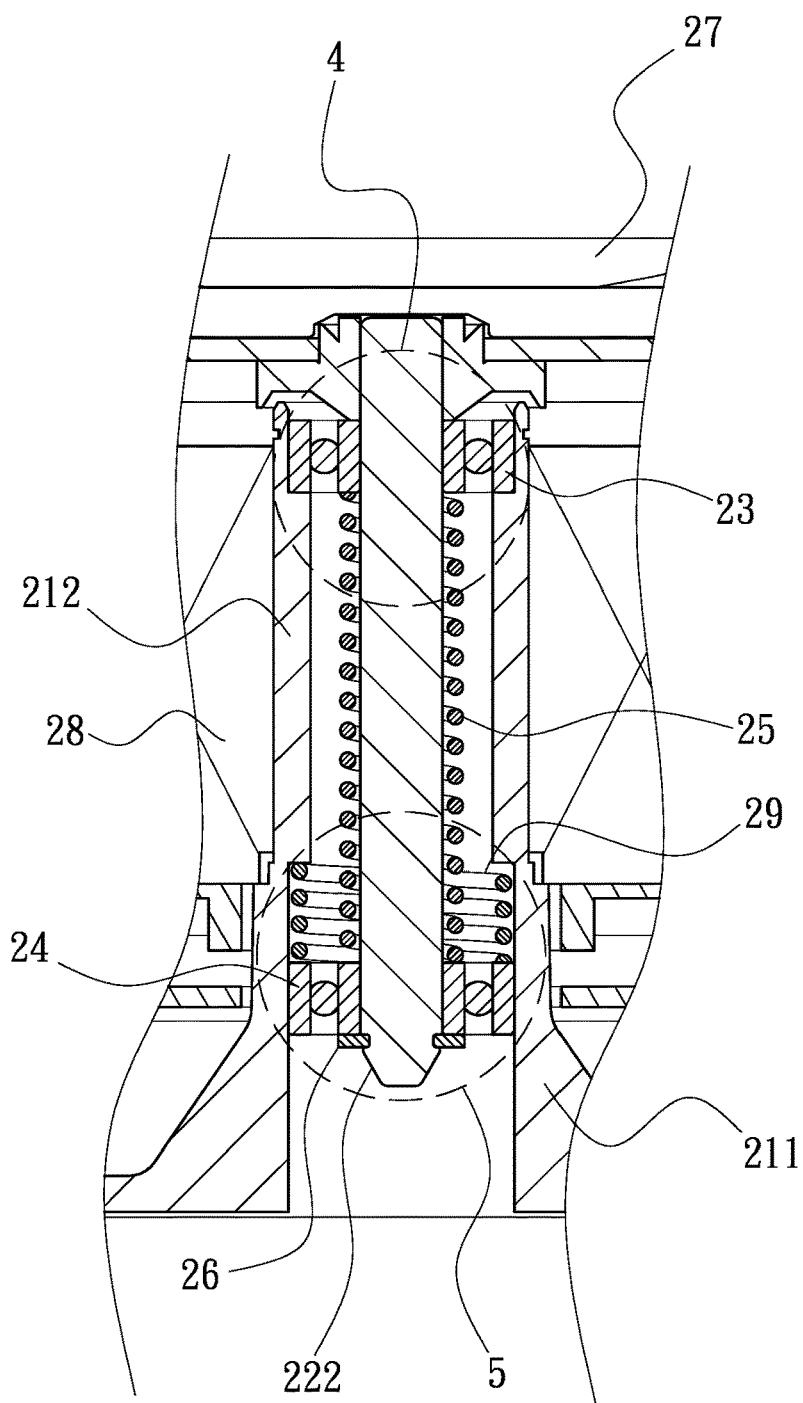
FIG. 3 is a partial cross-sectional view of the present invention.
Figure 4:
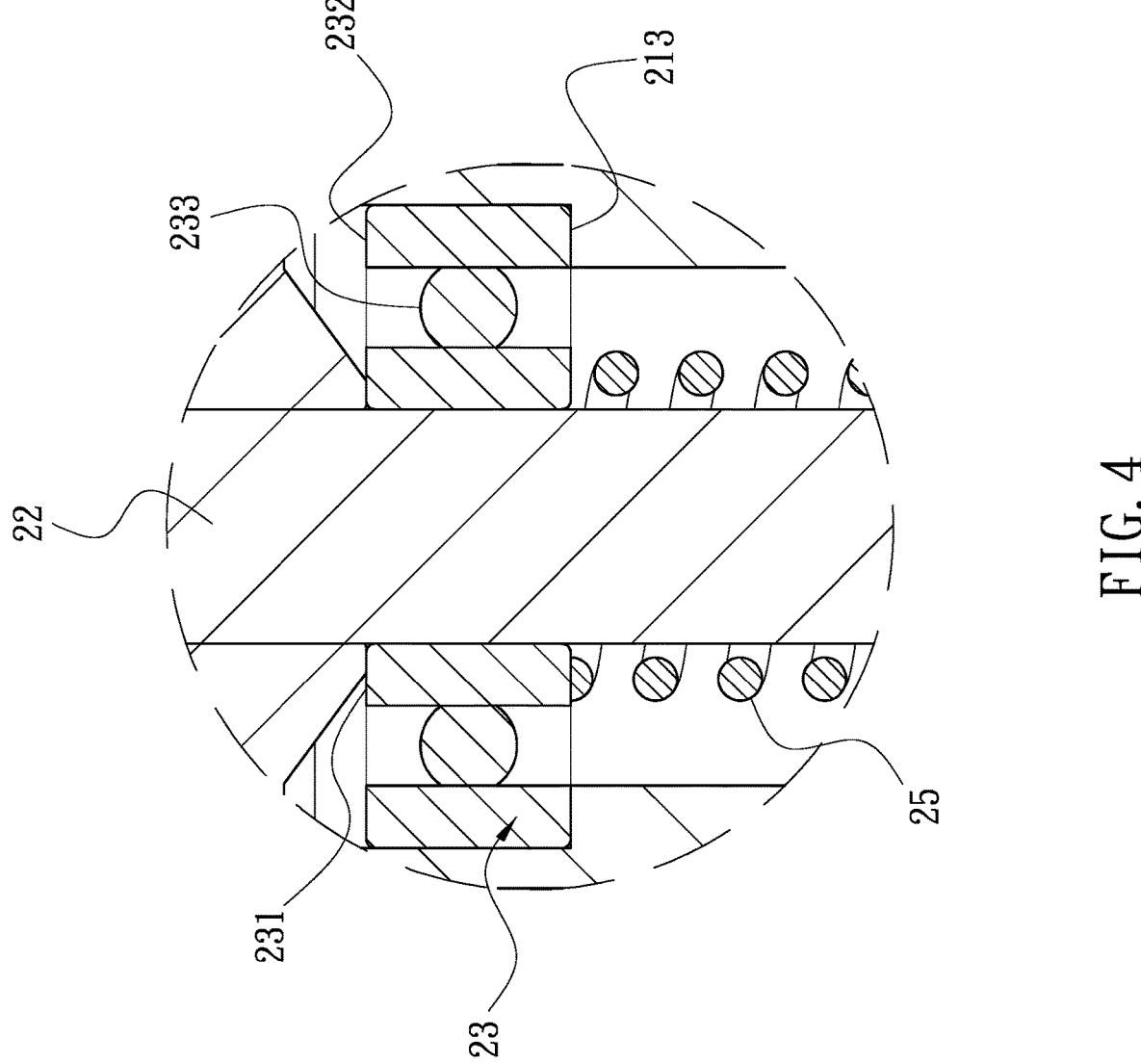
FIG. 4 is a partially enlarged view of FIG. 3.
Figure 5:
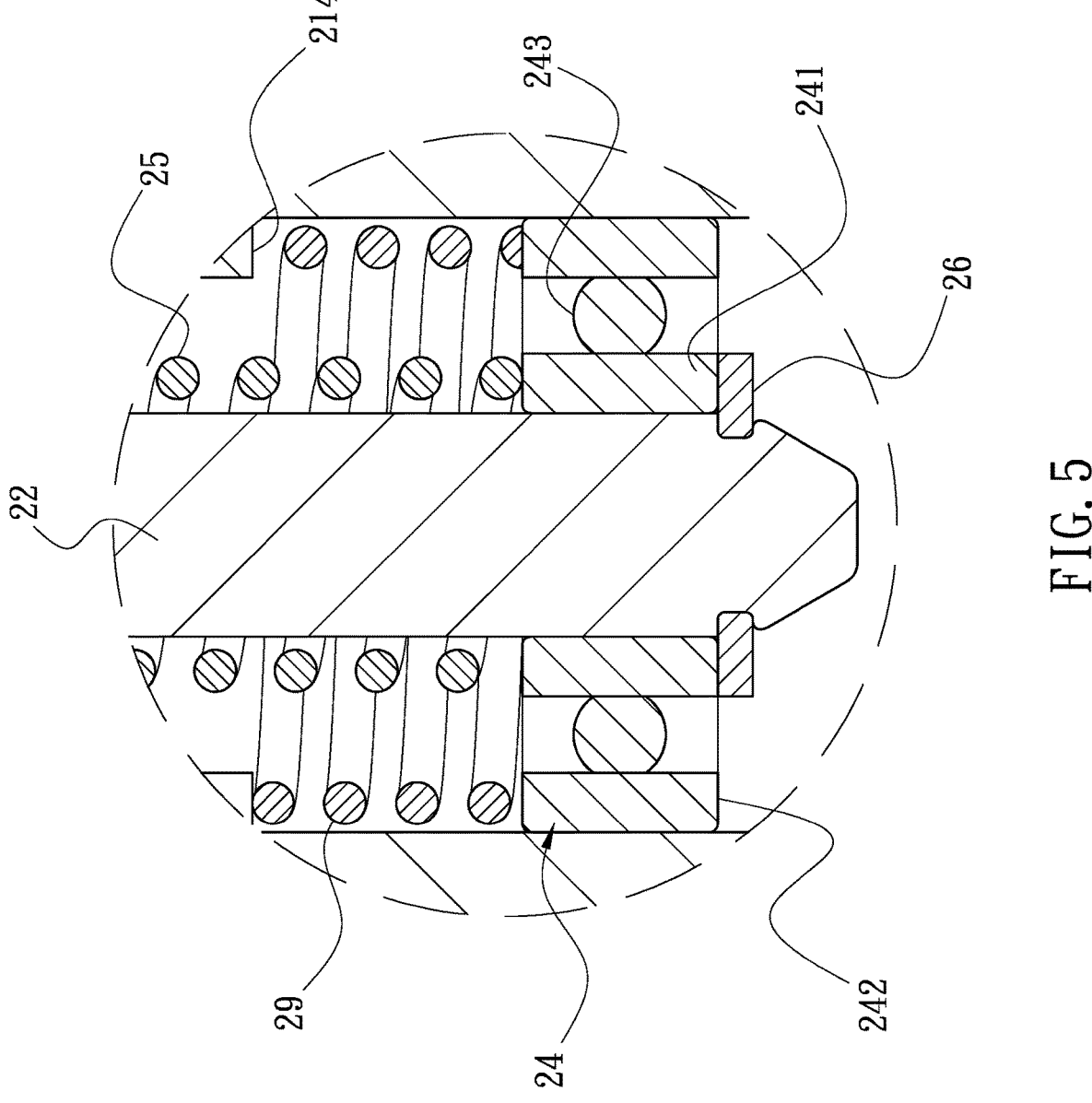
FIG. 5 is a partially enlarged view of FIG. 3.

Please refer to FIGS. 2-5. FIG. 2 is a schematic cross-sectional exploded view of the present invention. FIG. 3 is a schematic partial cross-sectional assembly view of the present invention. FIG. 4 is a partially enlarged view of FIG. 3. FIG. 5 is a partially enlarged view of FIG. 3.

As shown in the diagrams, the present invention includes a fan frame 21, a shaft core 22, a first bearing 23, a second bearing 24 and a first spring 25.

The fan frame 21 includes an air inlet side and an air outlet side, with a base 211 disposed on the air outlet side. The base 211 extends upward to form a hollow bearing sleeve 212. A stator 28 is positioned around the exterior of the bearing sleeve 212. Inside the bearing sleeve 212, an upper abutment portion 213 and a lower abutment portion 214 are provided at the upper and lower ends, respectively, arranged in a stepped configuration on the inner wall to facilitate bearing positioning.

The shaft core 22 comprises a connecting end 221 and a free end 222. The connecting end 221 secures the fan wheel 27, while the free end 222 extends into the bearing sleeve 212. A neck portion 223, located adjacent to the free end 222, accommodates additional components.

The first bearing 23 and the second bearing 24 are mounted within the bearing sleeve 212, positioned on the upper abutment portion 213 and the lower abutment portion 214, respectively. Each of the first bearing 23 and the second bearing 24 includes an inner ring 231, 241, an outer ring 232, 242, and a plurality of rolling members 233, 243 disposed between the inner and outer rings. The inner rings 231, 241 and outer rings 232, 242 rotate relative to each other via the rolling members 233, 243. The outer rings 232, 242 are fitted to the inner surface of the bearing sleeve 212 (e.g., the outer diameters of the outer rings 232, 242 correspond to the inner diameter of the bearing sleeve 212). The inner rings 231, 241 are fitted to the outer surface of the shaft core 22 (e.g., the inner diameters of the inner rings 231, 241 correspond to the outer diameter of the shaft core 22), enabling the first and second bearings 23, 24 to reliably support the rotation of the shaft core 22 and the fan wheel 27.

The outer ring 232 of the first bearing 23 abuts against the upper abutment portion 213. The first spring 25 is sleeved on the shaft core 22 and positioned between the inner ring 231 of the first bearing 23 and the inner ring 241 of the second bearing 24. The two ends of the first spring 25 firmly contact the inner rings 231 and 241, providing elastic support and maintaining their positioning.

Additionally, a second spring 29 is disposed between the outer ring 242 of the second bearing 24 and the lower abutment portion 214. One end of the second spring 29 abuts the lower abutment portion 214, while the other end contacts the outer ring 242 of the second bearing 24. The free end 222 of the shaft core 22 extends through the inner ring 241 of the second bearing 24 downward, where the neck portion 223 engages a retaining ring 26. The retaining ring 26 presses against the inner ring 241 from below the second bearing 24, securing the second bearing 24 and the second spring 29 to prevent disengagement from the shaft core 22 and the bearing sleeve 212.

Through this arrangement, the first spring 25 generates a pre-pressure that creates an axial elastic supporting force between the inner ring 231 of the first bearing 23 and the inner ring 241 of the second bearing 24. This force securely fixes the inner rings 231, 241 in a predetermined position, thereby restricting radial relative sliding between the inner rings 231, 241 and the shaft core 22 during high-speed operation of the fan wheel 27. This configuration enhances the stability of the first bearing 23 and the second bearing 24 while extending their service life.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A fan bearing fixing and anti-slipping structure comprising:
    a fan frame having a base disposed with a bearing sleeve protruding on the base;
    a shaft core having a connection end connected to a fan wheel and a free end extending into the bearing sleeve;
    a first bearing and a second bearing located in the bearing sleeve and mounted on the shaft core, each of the first bearing and the second bearing including an inner ring, an outer ring and a plurality of rolling members disposed between the inner ring and the outer ring, the outer ring fitted with the bearing sleeve and the inner ring fitted with the shaft core;
    a first spring sleeved on the shaft core and located between the first bearing and the second bearing, two ends of the first spring respectively abutting the inner rings of the first bearing and the second bearing, thereby generating an axial elastic supporting force between the inner rings of the first bearing and the second bearing, such that the inner rings of the first bearing and the second bearing are securely fixed at a predetermined position, and restricting radial relative sliding between the inner rings of the first bearing and the second bearing and the shaft core during high-speed fan operation,
    wherein the bearing sleeve includes an upper abutment portion and a lower abutment portion, and the first bearing and the second bearing are respectively arranged on the upper abutment portion and the lower abutment portion,
    wherein a second spring is provided between the outer ring of the second bearing and the lower abutment portion, and one end of the second spring abutting the lower abutment portion and the other end of the second spring abutting the outer ring of the second bearing.

2. The fan bearing fixing and anti-slipping structure in claim 1, wherein the shaft core includes a neck portion adjacent to the free end, and the neck portion being engaged by a retaining ring, and the retaining ring abuts the inner ring of the second bearing from an opposite side of the second bearing.

3. The fan bearing fixing and anti-slipping structure in claim 1, wherein the outer ring of the first bearing abuts against the upper abutment portion.

* * * * *